United States Patent
Wu et al.

(10) Patent No.: US 9,615,104 B2
(45) Date of Patent: Apr. 4, 2017

(54) SPATIAL VARIANT DEPENDENCY PATTERN METHOD FOR GPU BASED INTRA PREDICTION IN HEVC

(71) Applicants: Haihua Wu, San Jose, CA (US); Julia A. Gould, San Jose, CA (US)

(72) Inventors: Haihua Wu, San Jose, CA (US); Julia A. Gould, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 180 days.

(21) Appl. No.: 14/304,321

(22) Filed: Jun. 13, 2014

(65) Prior Publication Data

US 2015/0365691 A1   Dec. 17, 2015

(51) Int. Cl.
| | | |
|---|---|---|
| *G06F 15/00* | (2006.01) |
| *H04N 19/46* | (2014.01) |
| *G06F 9/48* | (2006.01) |
| *H04N 19/182* | (2014.01) |
| *H04N 19/176* | (2014.01) |
| *H04N 19/136* | (2014.01) |
| *H04N 19/436* | (2014.01) |

(52) U.S. Cl.
CPC ........... *H04N 19/46* (2014.11); *G06F 9/4881* (2013.01); *H04N 19/136* (2014.11); *H04N 19/176* (2014.11); *H04N 19/182* (2014.11); *H04N 19/436* (2014.11)

(58) Field of Classification Search
CPC .... H04N 19/46; H04N 19/436; H04N 19/136; H04N 19/182; H04N 19/176; G06F 9/4881
USPC ........................................................ 345/501
See application file for complete search history.

(56) References Cited

U.S. PATENT DOCUMENTS

| | | | | |
|---|---|---|---|---|
| 2008/0101720 A1* | 5/2008 | Wang | ................... | H04N 19/176 382/275 |
| 2008/0198166 A1* | 8/2008 | Chung | .................. | G06T 15/005 345/501 |
| 2009/0002379 A1* | 1/2009 | Baeza | ....................... | G06T 1/20 345/522 |
| 2012/0308148 A1* | 12/2012 | Kim | ....................... | H04N 19/00 382/233 |

* cited by examiner

*Primary Examiner* — Ke Xiao
*Assistant Examiner* — Kim-Thanh T Tran
(74) *Attorney, Agent, or Firm* — Lynch Law Patent Group, P.C.

(57) ABSTRACT

Systems, apparatus and methods are described including operations for graphics processing including spatial variant dependency pattern processing for GPU based intra prediction.

20 Claims, 11 Drawing Sheets

SPATIAL VARIANT DEPENDENCY PATTERN METHOD FOR GPU BASED INTRA PREDICTION IN HEVC

BACKGROUND

A video encoder compresses video information so that more information can be sent over a given bandwidth. The compressed signal may then be transmitted to a receiver that decodes or decompresses the signal prior to display.

Intel's Gen graphics media pipeline leverages an array of cores, or execution units (EUs), to execute a workload. This workload consists of kernels—a set of instructions compromising a program that is executed on the Gen hardware. Predominately, video decoder/encoder kernels contain thread dependency on the coding block level, where a thread must wait on dependency threads before starting its own execution. Under this situation, there is a small subset of the total number of threads that can actively run on the EUs at any given time. This often results in an under-utilization of the EUs. Additionally, the thread parallelism highly depends on the thread dependence pattern.

High Efficient Video Coding (HEVC) is a new video compression standard by the Joint Collaborative Team on Video Coding (JCT-VC) formed by ISO/IEC Moving Picture Experts Group (MPEG) and ITU-T Video Coding Experts Group (VCEG). The traditional thread dependency is a fixed pattern, meaning all the threads in the same thread space have the exact same thread dependency pattern. In some dependency logic (e.g., Intra Prediction in HEVC), with the fixed dependency pattern, we can only keep large thread data granularity (i.e. each thread covers 64×64 pixel data area).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
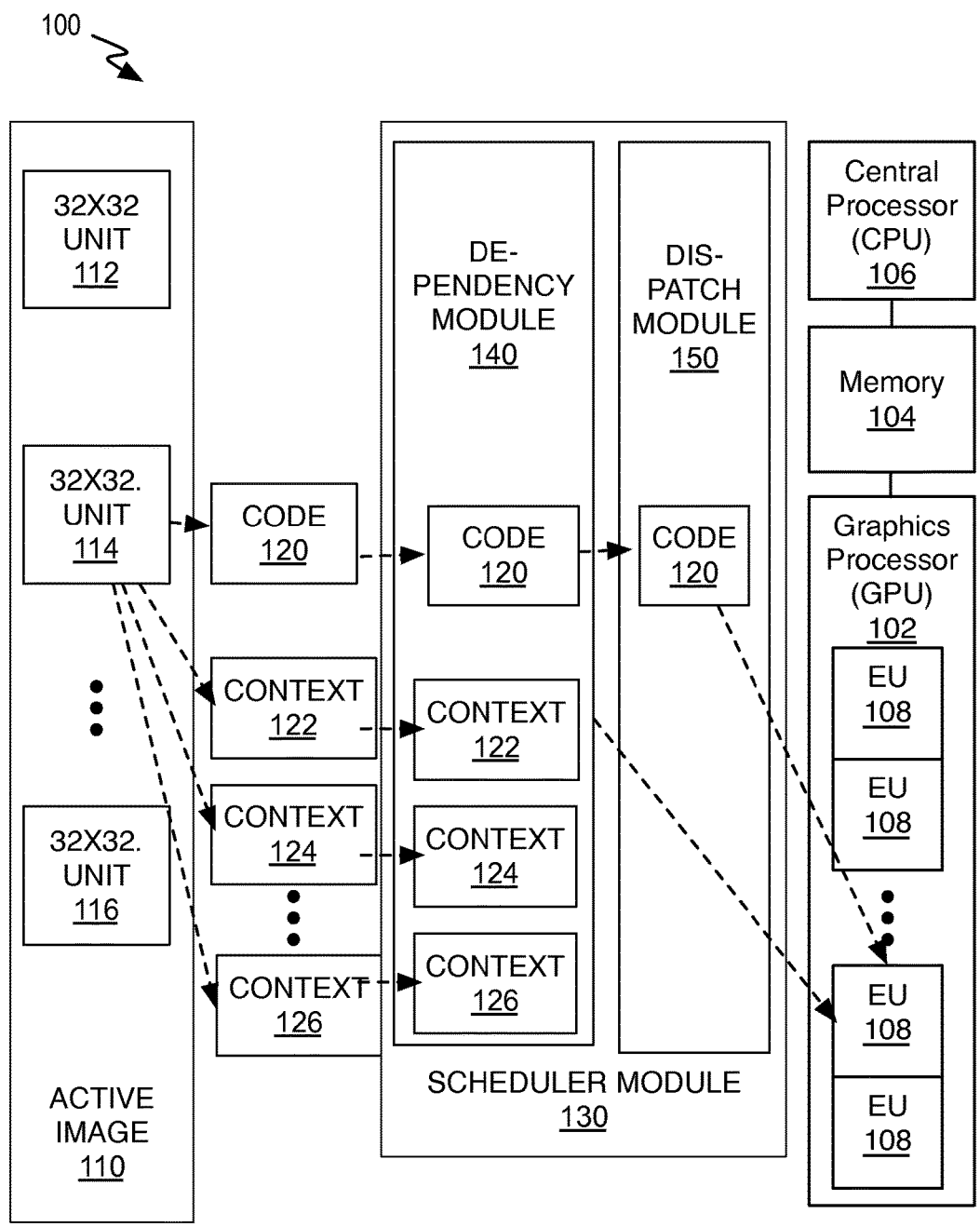
FIG. 1 is an illustrative diagram of an example graphics processing system for determining a variant parallel dependency pattern for the execution order of dependent threads during graphics processing.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, apparatus, articles, and methods are described below including operations for graphics processing including spatial variant dependency pattern processing for GPU based intra prediction.

As described above, the traditional thread dependency is a fixed pattern, meaning all the threads in the same thread space have the exactly same thread dependency pattern. (e.g., Wavefront 26 dependency pattern: each thread depends on the left neighbor thread, top-left neighbor thread, top neighbor thread, top right neighbor thread). In some dependency logic (e.g., Intra Prediction in HEVC), with the fixed dependency pattern, we can only keep large thread data granularity (i.e. each thread covers 64×64 pixel data area).

However, as will be described in greater detail below, the large thread data granularity of the traditional thread dependency usually means less number of software threads, and less parallel software threads. Fewer parallel software threads significantly degrades GPU parallelism and thus performance.

Therefore, a new spatial variant thread dependency pattern is described herein, which significantly improves the EU parallelism. The basic principle of this new spatial variant thread dependency pattern is to use a spatial variant thread dependency pattern to split large size pixel block to multiple small size pixel blocks, (where each pixel block may be handled by one software thread) while maintaining the correct data dependency. This may significantly increase both total software thread number and the parallelism ramp-up time, which may result in an increase in EU parallelism. For example, on Intel's Gen graphics (or other similar device), this idea can be implemented through either media object or media walker commands.

FIG. 1 is an illustrative diagram of an example graphics processing system 100, arranged in accordance with at least some implementations of the present disclosure. In various implementations, graphics processing system 100 may be configured to undertake video coding and/or implement video codecs according to one or more advanced video codec standards, such as, for example, the High Efficiency Video Coding (HEVC) H.265 video compression standard, or the like. Further, in various embodiments, graphics processing system 100 may be implemented as part of an image processor, video processor, and/or media processor.

In the illustrated implementation, graphics processing system 100 may process a current image 110 via an active application. Graphics processing system 100 may employ a graphics processor (GPU) 102 and a central processor (CPU) 106, each coupled to a system memory 104 (e.g., DRAM, eDRAM, etc.) by a bus. GPU 102 and CPU 106 may be disposed on a single piece of silicon (i.e., a single-chip solution), or integrated at a package, board, or system level. GPU 102 may include a plurality of parallel processing sub-systems, or slices. Each parallel processing sub-system may be replicated any number of times for greater parallel graphics processing power. Within a given parallel processing sub-system, there may be a number of execution units (EU) 108, also known as "shader cores," or simply "cores." Each EU 108 may contain scalar integer and floating-point arithmetic units that may execute instructions of an active program. Each EU 108 may have an instruction set architecture (ISA), may support context switching and pre-emptive multi-tasking, and may be essentially comparable in operation to a complete x86 core, for example. In some implementations, EUs 108 may be associated with a cache (not shown) (e.g., SRAM, eDRAM, etc.) that may act as a read-only memory of data for use in graphic is rendered for display by a platform hosting system 100.

In some examples, active image 110 may be divided into multiple computing units (e.g., unit 112, unit 114, unit 116, and/or the like). Each computing units 112/114/116 may correspond to a particular block partition size, e.g., a 32×32 pixel data area or smaller. Each computing units 112/114/116 may include code 120 corresponding to the 32×32 pixel data and various context data (illustrated as context 122, context 124, context 126, and/or the like)

Graphics processing system 100 may include one or more logic modules configured to coordinate processing of code 120. These logic modules may include a scheduler module 130 configured to schedule distribution of processing threads to one or more processors, such as to EUs 108, for example.

In some examples, scheduler module 130 may be communicatively coupled to processors 106/102/108. Scheduler module 130 may be configured to transfer computing unit code 120 to EUs 108 based at least in par on context data (e.g., context 122, context 124, and/or context 126, etc.) associated with the computing unit code 120. For example a plurality of computing units (e.g., unit 112, unit 114, unit 116, etc.) configurable for individual execution may include all or portions of active image 110. Accordingly, scheduler module 130 may operate in an environment where processing of active image 110 has computing tasks split into small computing units 112/114/116. Scheduler module 130 may be configured to determine a distribution of the computing unit code 120 to EUs 108.

Scheduler module 130 may include several component parts including, but not limited to, a dependency module 140 and/or a dispatch module 150. For example, dependency module 140 and/or a dispatch module 150 may be launchable from scheduler module 130.

As will be described in greater detail below, dependency module 140 may be configured to determine a variant dependency pattern. For example, a variant dependency pattern associated with a plurality of pixel blocks of an active image may be determined based at least in part on one or more contexts (e.g., context 122, context 124, and/or context 126, etc.) associated with individual pixel blocks, via dependency module 140. The determined variant dependency pattern may be configured to establish an execution order of individual dependent threads associated with individual pixel blocks. The determined variant dependency pattern may include a variant set of dependency vectors configured to establish a relationship between a dependent thread and one or more associated threads.

As will be discussed in greater detail below, in some implementations, the one or more contexts (e.g., context 122, context 124, and/or context 126, etc.) may include a relative location of individual pixel blocks of active image 110. In such an example, the dependency pattern may be spatially variant based at least in part on the relative location of individual pixel blocks of active image 110. For example, a set of four adjacent pixel blocks of the active image may be made to have a maximum of five dependencies for an upper left pixel block, a maximum of four dependencies for an upper right pixel block, a maximum of four dependencies for a lower left pixel block, and a maximum of three dependencies for a lower right pixel block.

Additionally or alternatively, the one or more contexts (e.g., context 122, context 124, and/or context 126, etc.) may include a coding mode data associated with individual pixel blocks of the active image. In such an example, the dependency pattern may be content variant based at least in part on the coding mode data of individual pixel blocks of active image 110.

In some examples, dispatch module 150 may be configured to determine when one of the EUs 108 becomes available. The transferring of computing unit code 120 to a given EU 108 may be performed via dispatch module 150 in response to EU 108 becoming available.

In some examples, graphics processing system 100 may include additional items that have not been shown in FIG. 1 for the sake of clarity. For example, graphics processing system 100 may include a display, an imaging device, a video coder, a radio frequency-type (RF) transceiver, and/or an antenna. Further, graphics processing system 100 may include additional items such as a speaker, a microphone, an accelerometer, memory, a router, network interface logic, etc. that have not been shown in FIG. 1 for the sake of clarity. As used herein, the term "coder" may refer to an encoder and/or a decoder. Similarly, as used herein, the term "coding" may refer to encoding via an encoder and/or decoding via a decoder.

In operation, graphics processing system 100 may utilize dependency module 140 to determine a variant dependency pattern. For example, the variant dependency pattern may be set on a 32×32 pixel block granularity, although other granularities may be utilized. In such an example, the sequentially executing, via execution units 110, of individual computing unit threads may result in parallel processing of up to 5 individual computing unit threads.

As will be discussed in greater detail below, graphics processing system 100 may be used to perform some or all of the various functions discussed below in connection with FIGS. 7 and/or 8.

Figure 2:
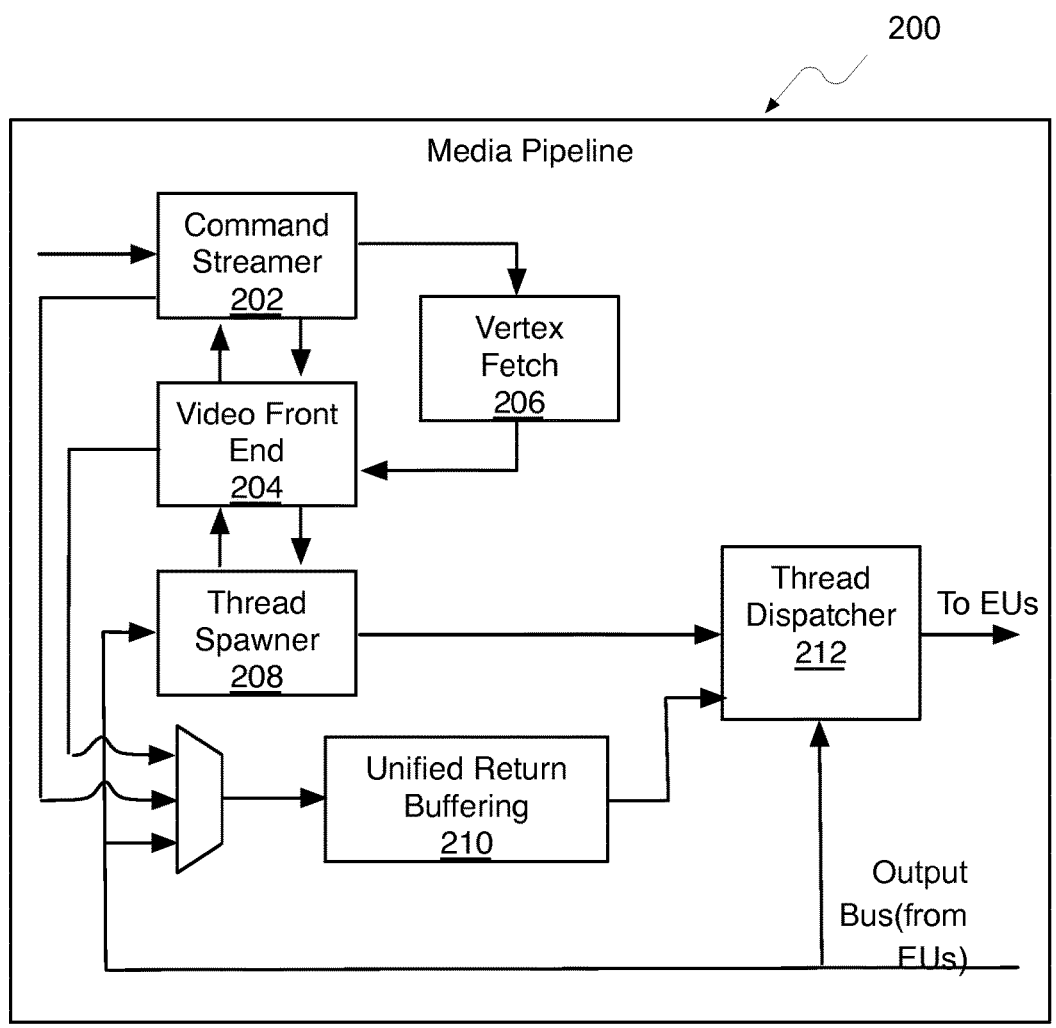
FIG. 2 is an illustrative diagram of an example graphics processing system.

FIG. 2 is an illustrative diagram of another implementation of a media pipeline 200, arranged in accordance with at least some implementations of the present disclosure. In the illustrated implementation, media pipeline 200 may include command streamer (CS) 202, video front end (VFE) 204, vertex fetch module 206, thread spawner 208, unified return buffer (URB) 210, thread dispatcher 212, the like, and/or combinations thereof.

In one implementation, the media (e.g., general purpose) pipeline may include two fixed function units: video front end 204 and thread spawner 208, although this is not required. For example, the video front end 204 may interface with the command streamer 202, receive indirect data via vertex fetch module 206, write thread payload data into the unified return buffer 210, and prepare threads to be dispatched through the thread dispatcher 212. The video front end 204 may also contain a hardware variable length decode engine (not shown). The thread spawner 208 may be the only unit that interfaces to the thread dispatcher 212 for new threat generation. The video front end 204 and thread spawner 208 may share the same or similar basic building blocks as might be employed in a 3D pipeline for example.

Further, in various embodiments, media pipeline 200 may be implemented as part of an image processor, video processor, and/or media processor, such as, for example, graphics processing system 100 (see, e.g., FIG. 1). In some examples, media pipeline 200 may include additional items that have not been shown in FIG. 2 for the sake of clarity.

As will be discussed in greater detail below, a graphics media pipeline 200 may use scoreboarding to enforce thread dependency. Each thread may have an associated (X,Y) coordinate within the thread space. Each thread may have up to eight dependencies. The dependency relation may be described by the relative distance (deltaX, deltaY) in the scoreboard.

Figure 3:
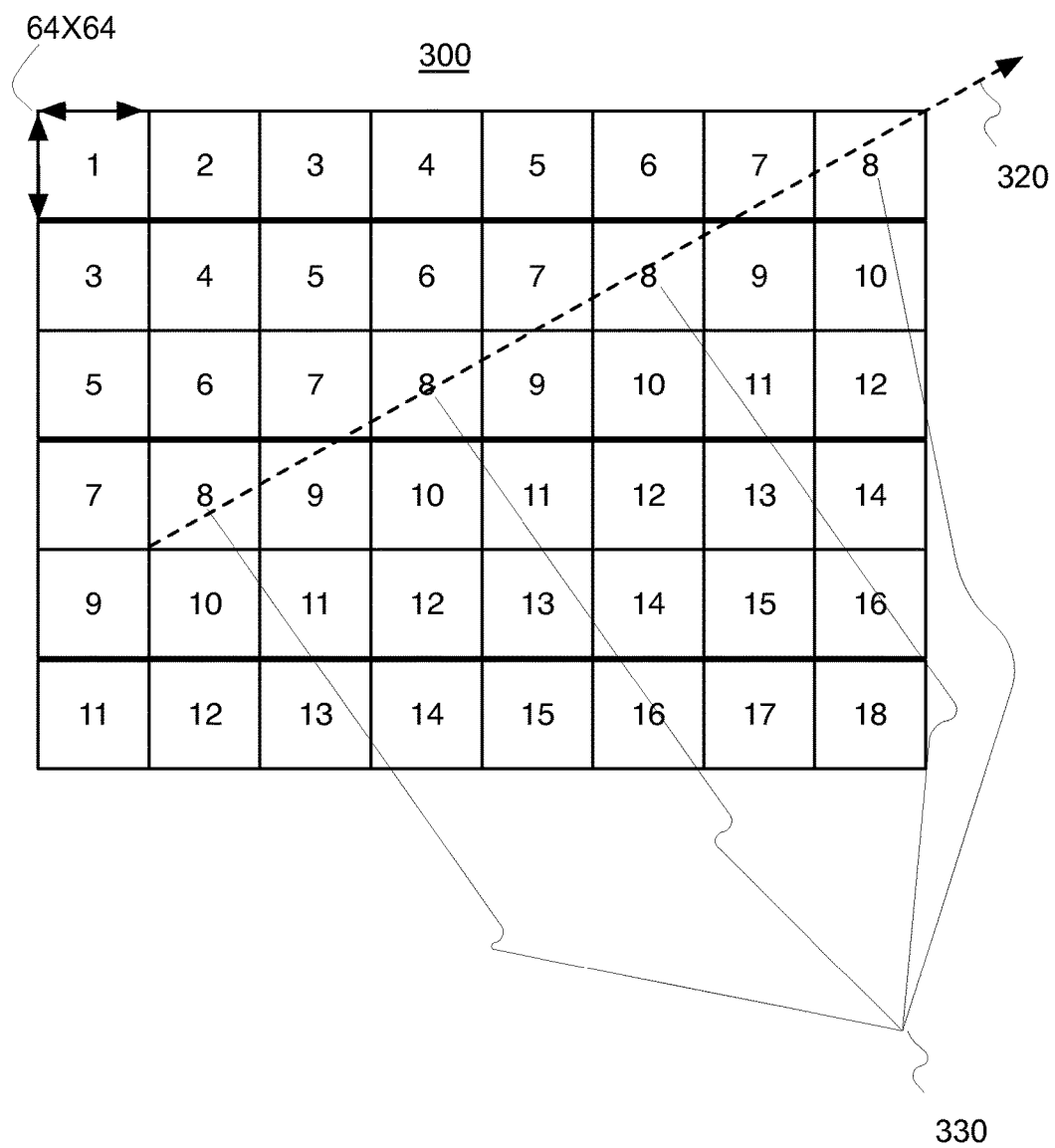
FIG. 3 is an illustrative diagram of an example parallel dependency pattern for the execution order of dependent threads during graphics processing.

FIG. 3 is an illustrative diagram of an example parallel dependency pattern 300 for the execution order of dependent threads during graphics processing. As illustrated, parallel dependency pattern 300 may have thread dependencies with, for example, a wavefront 26 dependency pattern. In such a wavefront 26 dependency pattern, each thread may depend upon the left neighbor thread, top-left neighbor thread, top neighbor thread, and top-right neighbor thread. This results in waves of threads that can run concurrently.

In such a fixed dependency pattern, only large data granularity may be kept. Accordingly, each thread shown covers a 64×64 pixel data area. Larger thread data granularity usually means fewer software threads and fewer parallel software threads. Fewer parallel software threads significantly degrade graphics processing unit parallelism and thus performance.

In FIG. 3, each 64×64 pixel data area has been labeled with a number 1 to 18 to represent its thread execution order based on the example wavefront 26 dependency pattern. From this example, it is noted that of the 48 total threads, the maximum that can run concurrently is merely 4 threads: reference lines 330 identify the four threads to be executed eighth in this dependency pattern. Moreover, this maximum concurrent thread number is reached after a warm-up period and followed by a cool-down period: the threads to be executed sixth and thirteenth are only three in number. Similarly, no parallelism is available for threads 1, 2, 17, and 18. Furthermore, dashed reference line 320 illustrates that the peak number of concurrent threads is related to the width and/or height of the thread space: if this example wavefront 26 dependency pattern thread space were wider and/or taller, a fifth thread to be executed eighth may have been implicated.

Figure 4:
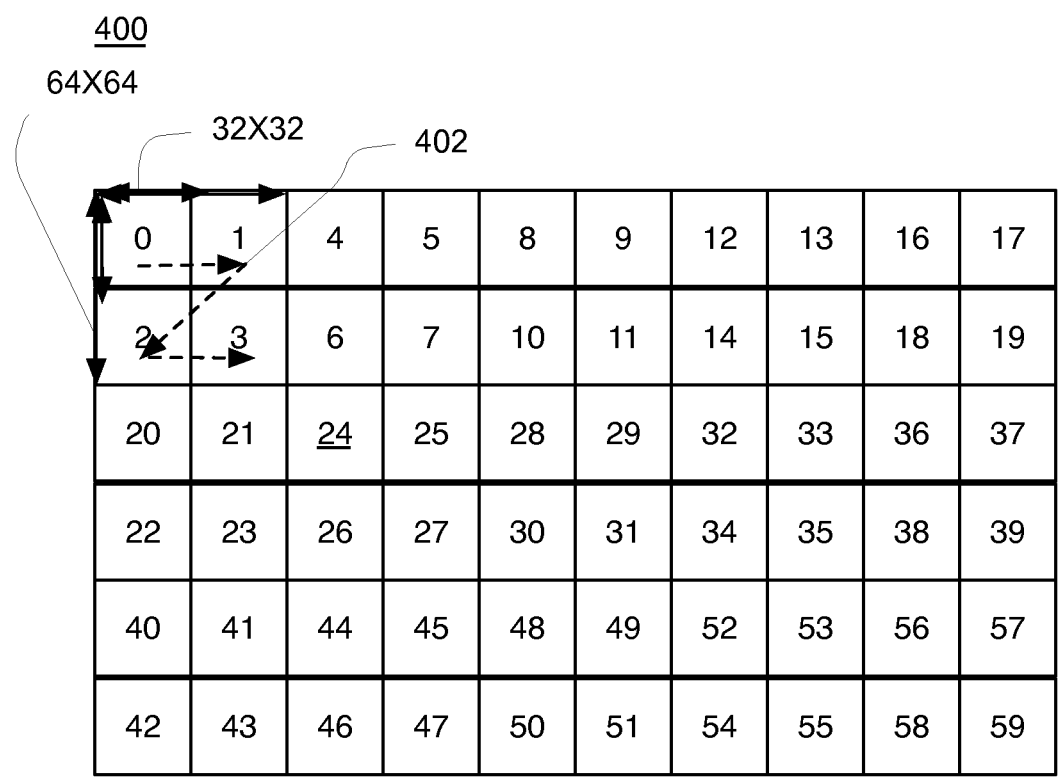
FIG. 4 is an illustrative diagram of an example dispatch pattern for dispatching threads to execution units during graphics processing.

FIG. 4 is an illustrative diagram of an example dispatch pattern 400 for dispatching threads to execution units during graphics processing. As illustrated, each block 0 through 59, of dispatch pattern 400, represents one 32×32 pixel data partition. On 64×64 pixel data granularity, where each 64×64 pixel data partition contains four 32×32 pixel data partitions, the prediction unit stream parsing order is raster scan, meaning line-by-line left to right. Inside each 64×64 pixel data partition, on 32×32 pixel data granularity, the prediction unit stream parsing order is Z-scan, shown by reference lines 402. Accordingly, blocks 0 through 59 have been labeled with their prediction stream parsing order: the first 64×64 pixel data partition (which includes blocks 0 through 3) is parsed, then the 32×32 pixel data partitions represented by blocks 0 through 3 are parsed in Z-scan order. The second 64×64 pixel data partition to the immediate right of the first 64×64 pixel data partition (which includes blocks 4 through 7) is then parsed, with the 32×32 pixel data partitions represented by blocks 4 through 7 parsed in Z-scan order.

In video coding, a Coding Unit (CU) or Prediction Unit (PU) has multiple available coding modes and prediction modes. In HEVC, a picture is coded in the unit of Largest Coding Unit (LCU). A LCU can be a 128×128 block, a 64×64 block, a 32×32 block or a 16×16 block. A LCU can be encoded directly or be divided into 4 Coding Units (CU) for encoding. Coding Units can be encoded directly or be further divided. The smallest CU is typically 8×8. In general, a CU may be divided into different size of Prediction Units (PU) for prediction. For example, in intra coding, a 2N×2N CU can be encoded in one 2N×2N PU or in four N×N PUs. For inter coding, a 2N×2N CU can be encoded in one 2N×2N PU, or two 2N×N PUs, or two N×2N PUs, or 0.5N×2N PU+1.5N×2N PU, or 1.5N×2N PU+0.5N×2N PU, or 2N×0.5N PU+2N×1.5N PU, or 2N×1.5N PU+2N×0.5N PU, or four N×N PUs.

For example, a CU can be encoded in intra mode or inter mode, and for intra mode, a PU has multiple available prediction modes, e.g., DC prediction, planar prediction, vertical prediction, horizontal prediction and other directional predictions. Coding may utilize different coding mode and prediction modes that can have different residual prediction schemes. For example, coding may apply linear residual prediction for intra mode and not apply residual prediction for inter mode.

A dependent prediction unit must be parsed earlier than the current prediction unit in the bit stream order, otherwise the dependency is disabled. There are 2 levels of stream ordering, on the higher level (64×64 pixel granularity), the ordering may be raster scan, on the lower level (32×32 or smaller pixel granularity), the ordering may be Z-scan.

Consider a traditional HEVC fixed thread dependency pattern, the thread data granularity must be set on a 64×64 pixel level. Again, such a large thread data granularity may mean less total thread number. With the example of FullHD 1920×1080 pixel plane: thread_space_width=30, thread_space_height=17, the total thread number would be 30*17=510. And the peaking thread number (i.e. maximum threads that can run in parallel) for this wavefront 26 is min(thread_space_width/2, thread_space_height)=15.

Conversely, in implementations described herein, a variant dependency pattern may be set on a 32×32 pixel block granularity, although other granularities may be utilized. The proposed spatial variant thread dependency pattern may use a spatial (e.g., and/or mode, etc.) variant thread dependency pattern to split large size pixel block to multiple small size pixel blocks, (where each pixel block may be handled by one software thread) while maintaining the correct data dependency. This may significantly increase both total software thread number and the parallelism ramp-up time, which may result in an increase in EU parallelism.

Furthermore, in some implementations of the proposed spatial variant dependency enabled pattern, even more software threads may be achieved if the threads are split to smaller granularity (e.g., 16×16, 8×8 or even 4×4 granularity levels). In such implementations, similar thread dependency patterns could be applied when the stream parser ordering is recursively Z-order on 16×16, 8×8 and 4×4 granularity.

Figure 5A:
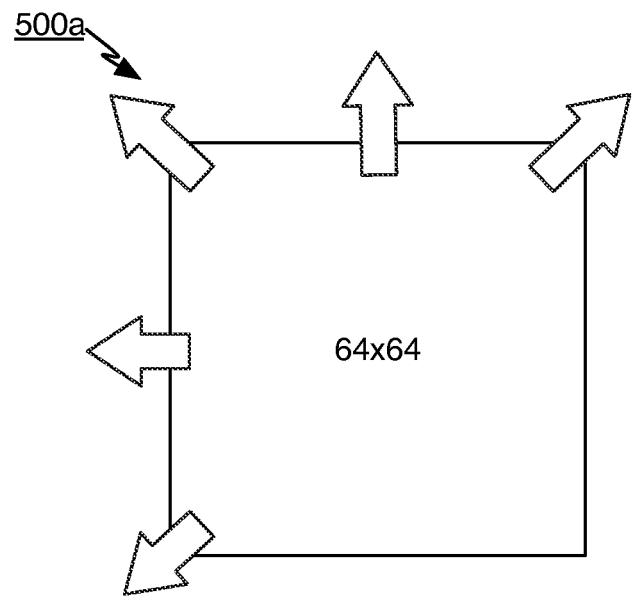
FIG. 5A is an illustrative diagram of an example fixed parallel dependency pattern on a 64×64 pixel block granularity level.

FIG. 5A is an illustrative diagram of an example fixed parallel dependency pattern 500a on a 64×64 pixel block granularity level. As illustrated, fixed parallel dependency pattern 500a requires threads for the illustrated 64×64 pixel data block to have fixed dependencies. For each interior square-shape prediction unit, 5 dependencies are required, to its bottom-left neighbor thread, left neighbor thread, top-left neighbor thread, top neighbor thread, and top-right neighbor thread. In terms of (deltaX, deltaY), these required 5 dependencies are (−1,1) (−1,0) (−1,−1) (0,−1) and (1,−1). Each interior thread has a dependency with the thread to its bottom-left, directly left, left above, directly above, and to its upper right.

This traditional thread dependency is a fixed pattern, meaning all the threads in the same thread space have the exactly same thread dependency pattern. (e.g., Wavefront 26 dependency pattern: each thread depends on the left neighbor thread, top-left neighbor thread, top neighbor thread, top right neighbor thread). In some dependency logic (e.g., Intra Prediction in HEVC), with the fixed dependency pattern, we can only keep large thread data granularity (i.e. each thread covers 64×64 pixel data area). Large thread data granularity usually means less number of software threads, and less parallel software threads. Fewer parallel software threads significantly degrades GPU parallelism and thus performance.

Figure 5B:
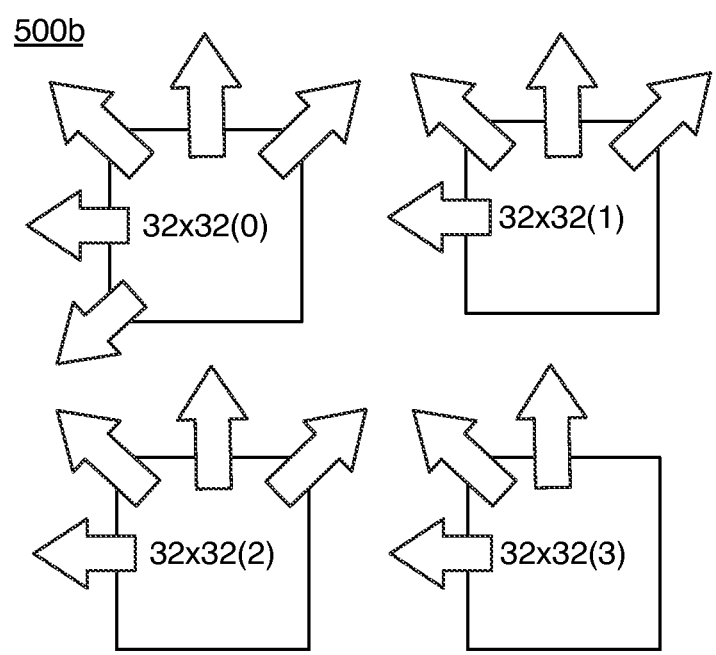
FIG. 5B is an illustrative diagram of an example variant parallel dependency pattern on a 32×32 pixel block granularity level that is spatially variant.

FIG. 5B is an illustrative diagram of an example variant parallel dependency pattern 500b on a 32×32 pixel block granularity level that is spatially variant, in accordance with at least some implementations of the present disclosure. The illustrated variant parallel dependency pattern 500b may be referred to as a 5/4/4/3 dependency pattern. This 5/4/4/3 type variant parallel dependency pattern 500b may be established based on spatial data, and without further considering other optional content, such as, mode data.

As illustrated, the prediction unit stream parsing order of FIG. 4 may be applied. The thread for the illustrated 32×32 pixel data block 0 has five dependencies: to its bottom-left neighbor thread, left neighbor thread, top-left neighbor thread, top neighbor thread, and top-right neighbor thread. The thread for the illustrated 32×32 pixel data block 1 has four dependencies: to its left neighbor thread, top-left neighbor thread, top neighbor thread, and top-right neighbor thread. Because 32×32 pixel data block 1 is parsed before 32×32 pixel data block 2, 32×32 pixel data block 1 does not have a dependency to 32×32 pixel data block 2 to its bottom-left. Similarly, the thread for the illustrated 32×32 pixel data block 2 has four dependencies: to its left neighbor thread, top-left neighbor thread, top neighbor thread, and top-right neighbor thread. Because any pixel data block to the bottom-left of 32×32 pixel data block 2 would be parsed after 32×32 pixel data block 2, 32×32 pixel data block 2 does not have a dependency to its bottom-left. The thread for the illustrated 32×32 pixel data block 3 has three dependencies: to its left neighbor thread, top-left neighbor thread, and top neighbor thread. Because any pixel data block to the bottom-left or top-right of 32×32 pixel data block 3 would be parsed after 32×32 pixel data block 3, 32×32 pixel data block 3 does not have dependencies to its bottom-left or top-right.

Accordingly, referring back to FIG. 4, the prediction unit stream parsing order may permit more dependency patterns than available in dependency patterns. In one example, each thread typically has five dependencies: its bottom-left neighbor thread, left neighbor thread, top-left neighbor thread, top neighbor thread, and top-right neighbor thread. For block 24, each of its five dependent neighbor blocks (23, 21, 3, 6, and 7) have smaller block indexes indicating they are parsed before block 24, so block 24 may have five dependencies. In contrast, for block 25, its bottom left neighbor (block 26) has a larger block index indicating it is parsed after block 25, so the dependency of block 25 on block 26 may be disabled. Accordingly, a variant dependency pattern might be determined to reflect the context associated with block 25 may permit four dependencies instead of the typical five dependencies.

Accordingly, as addressed by implementations described herein, not all threads actually require all 5 of these dependencies, as the dependency may also impacted by the prediction unit stream parsing order. For each square-shape prediction unit, a maximum of 5 dependencies are allowed, but fewer may be utilized depending on the context associated with each prediction unit (e.g., the relative location of the prediction unit, the mode associated with the prediction unit, etc.). In terms of (deltaX, deltaY), this maximum of 5 dependencies may be (−1,1) (−1,0) (−1,−1) (0,−1) and (1,−1) but fewer dependencies may be utilized. Each thread has a dependency selected from the threads to its bottom-left, directly left, left above, directly above, and to its upper right.

In FIG. 5B, compared to FIG. 5A, both the thread space width and thread space height are doubled, so the total thread number implied by FIG. 5B is four times that of the fixed dependency method of FIG. 5A. Peak parallelism in FIG. 5B may thus be likely to be significantly higher.

Additionally, it is important to note that these improvements do not even factor in potential further efficiencies made possible by further considering other contexts (e.g. mode data) to further reduce the number of dependencies required by variant dependency pattern 500b. For example, considering the real dependency can be used to further reduce the number of dependencies required by variant dependency pattern 500b with run-time information (e.g. via mode data). In such an example, the variant dependency pattern 500b of FIG. 5B (here a 5/4/4/3 dependency) that only considers special context may be a worst case that can be further improved upon by further considering other contexts (e.g. mode data, etc.).

Figure 6A:
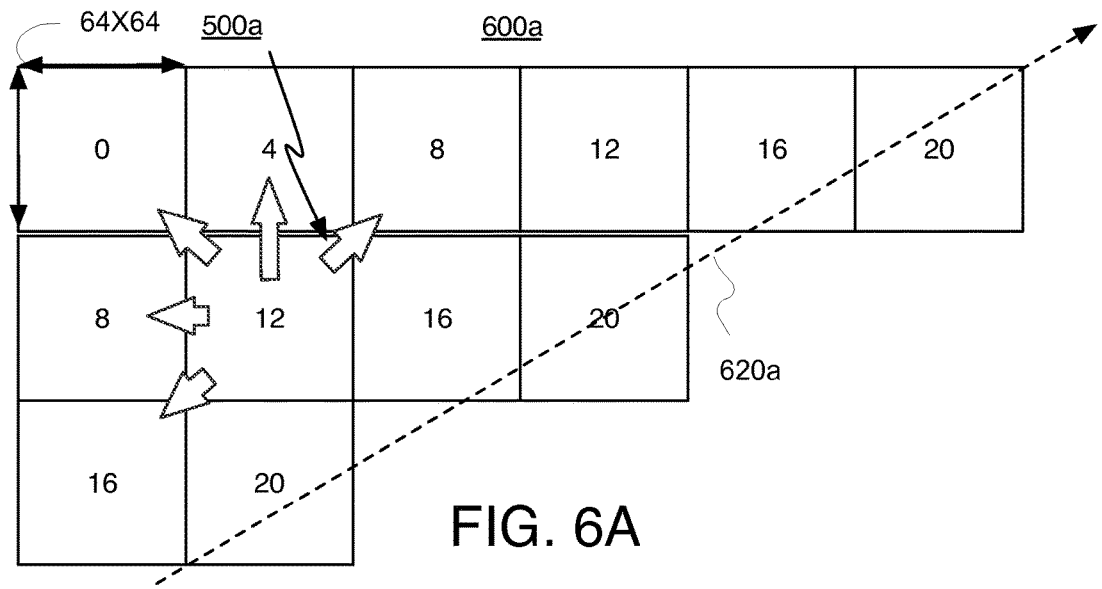
FIG. 6A is an illustrative diagram of the ramp up speed of an example fixed parallel dependency pattern implemented on a 64×64 pixel block granularity level.

FIG. 6A is an illustrative diagram of the ramp up speed of an example video coding process 600a implementing an example fixed parallel dependency pattern 500a implemented on a 64×64 pixel block granularity level. As illustrated, the Wavefront 26 dependency pattern 500a implemented on a 64×64 pixel block granularity is shown having taken twenty-four steps. In this illustration, these twenty-four steps result in twelve large 64×64 pixel blocks being processed. For comparison purposes, 64×64 pixel blocks would be equivalent in data to forty-eight mid-size 32×32 pixel blocks.

As illustrated, the Wavefront 26 dependency pattern 500a results in a twenty six degree wave front in terms of (X,Y) slope, where a higher slope corresponds to greater parallel processing efficiency.

Figure 6B:
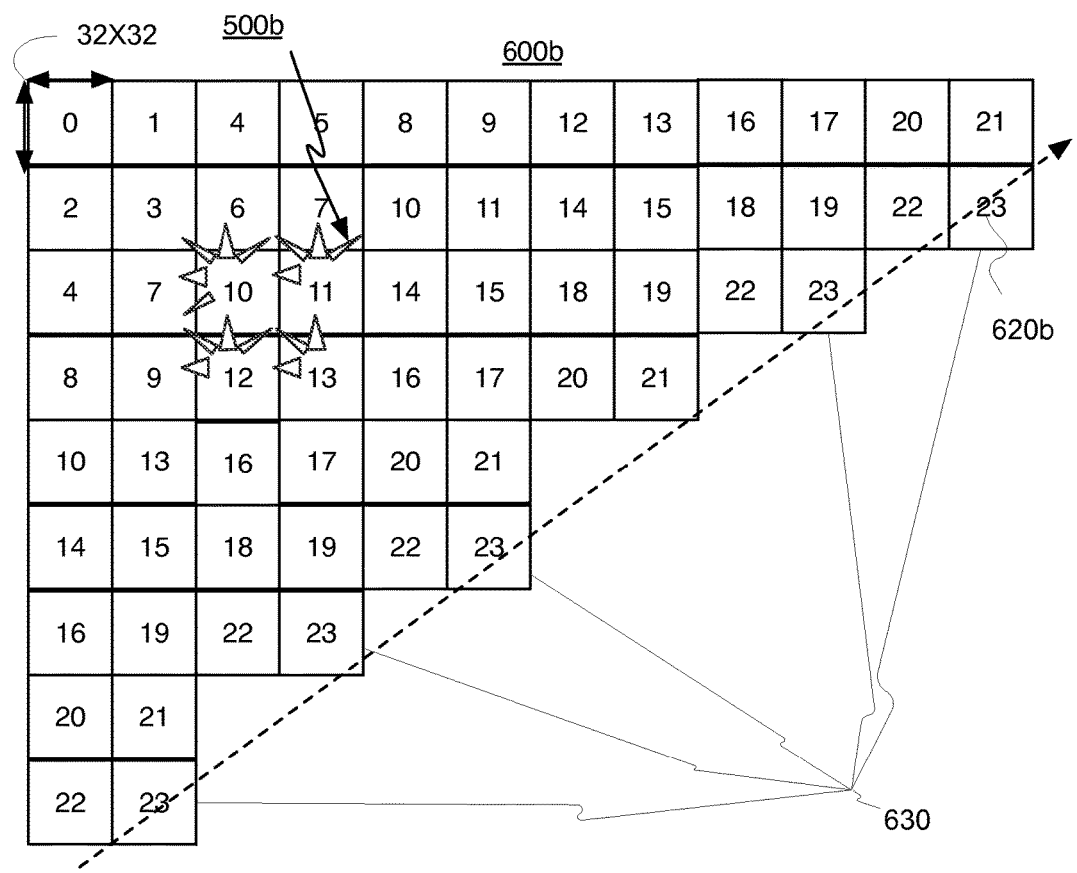
FIG. 6B is an illustrative diagram of the ramp up speed of an example spatially variant parallel dependency pattern on a 32×32 pixel block granularity level.

FIG. 6B is an illustrative diagram of the ramp up speed of an example video coding process 600b implementing an example spatially variant parallel dependency pattern 500b (e.g., with a 5/4/4/3 dependency pattern established based on spatial data, and without further considering other optional content, such as, mode data) on a 32×32 pixel block granularity level, in accordance with at least some implementations of the present disclosure. As illustrated, variant dependency pattern 500b implemented on a 64×64 pixel block granularity is shown having taken twenty-four steps to parse sixty-two 32×32 pixel data blocks, in accordance with at least some implementations of the present disclosure.

In this example, reference lines 630 illustrate that the maximum number of parallel threads in FIG. 6B as being five, in contrast to the maximum number of parallel threads in FIG. 6A of three. Dashed reference line 620 illustrates that the peak number of concurrent threads is related to the width and/or height of the thread space: the smaller data granularity of FIG. 6B as compared to FIG. 6A allows for additional thread space to be addressed in twenty-four sets of parallel threads.

Additionally, with the same number of steps (e.g., 24 steps as compared to FIG. 6A), the proposed spatial variant dependency enabled pattern 500b results in a 30% faster ramp-up speed, as compared to the Wavefront 26 dependency pattern on a 64×64 pixel block granularity (see, e.g., FIG. 4A). Ramp-up speed is a key factor impacting the GPU parallelism; where the proposed solution has a substantial advantage over traditional solutions.

Further, the variant dependency pattern 500a results in a wave front of thirty degrees in terms of (X,Y) slope, as compared with a wave front of twenty six degrees for the Wavefront 26 dependency pattern 500a, where a higher slope corresponds to greater parallel processing efficiency.

Additionally, it is important to note that these improvements do not even factor in potential further efficiencies made possible by further considering other contexts (e.g. mode data) to further reduce the number of dependencies required by variant dependency pattern 500b. For example, considering the real dependency can be used to further reduce the number of dependencies required by variant dependency pattern 500b with run-time information (e.g. via mode data). In such an example, the variant dependency pattern 500b of FIG. 5B (here a 5/4/4/3 dependency) that only considers special context may be a worst case that can be further improved upon by further considering other contexts (e.g. mode data, etc.).

Figure 7:
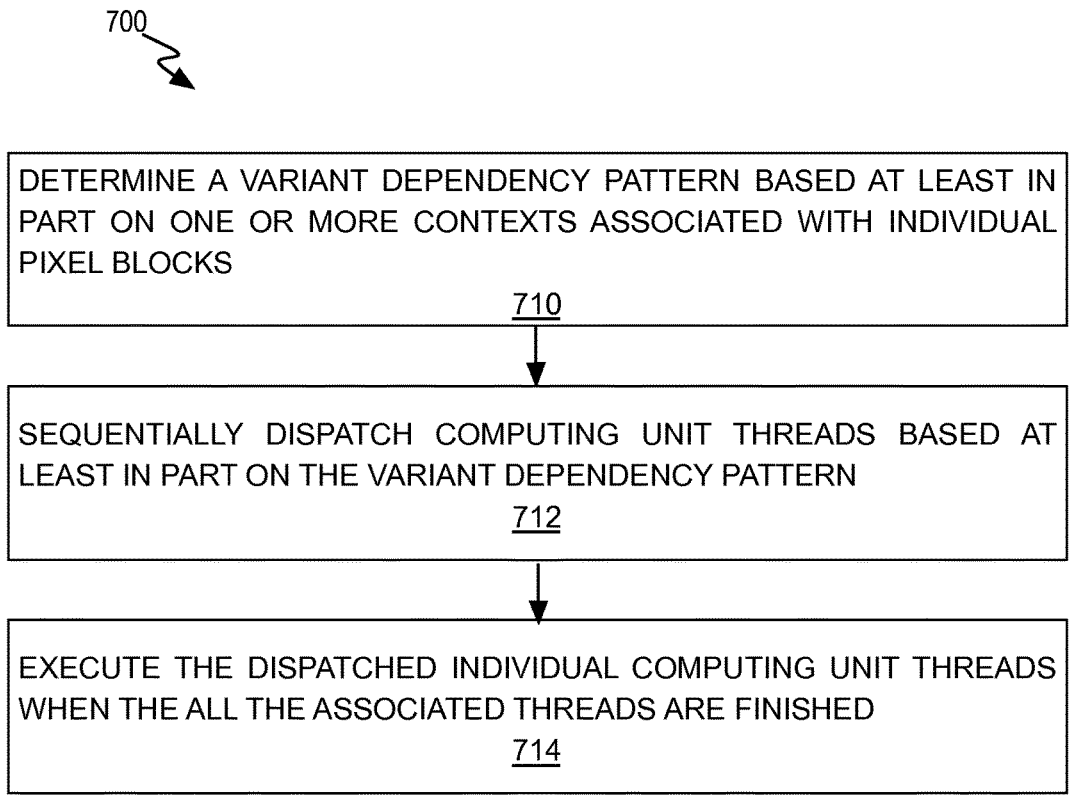
FIG. 7 is an illustrative diagram of an example graphics process for determining a variant parallel dependency pattern for the execution order of dependent threads during graphics processing.

FIG. 7 is a flow chart illustrating an example video coding process 700, arranged in accordance with at least some implementations of the present disclosure. In the illustrated implementation, process 700 may include one or more operations, functions or actions as illustrated by one or more of blocks 710, etc. By way of non-limiting example, process 700 will be described herein with reference to example graphics processing system 100 of FIGS. 1 and/or 9.

Process 700 may be utilized as a computer-implemented method for video coding. Process 700 may begin at block 710, "DETERMINE A VARIANT DEPENDENCY PATTERN BASED AT LEAST IN PART ON ONE OR MORE CONTEXTS ASSOCIATED WITH INDIVIDUAL PIXEL BLOCKS", where a variant dependency pattern may be determined. For example, a variant dependency pattern associated with a plurality of pixel blocks of an active image may be determined based at least in part on one or more contexts associated with individual pixel blocks, via a dependency module.

In some implementations, the determined variant dependency pattern may be configured to establish an execution order of individual dependent threads associated with individual pixel blocks. The determined variant dependency pattern may include a variant set of dependency vectors configured to establish a relationship between a dependent thread and one or more associated threads.

Processing may continue from operation 710 to operation 712, "SEQUENTIALLY DISPATCH COMPUTING UNIT THREADS BASED AT LEAST IN PART ON THE VARIANT DEPENDENCY PATTERN", where computing unit threads may be sequentially dispatched. For example, computing unit threads associated with individual pixel blocks may be sequentially dispatched to individual execution units of a graphics processor based at least in part on the variant dependency pattern, via a dispatch module.

For example, all associated threads may be dispatched earlier than a dependent thread based at least in part on the variant dependency pattern. As illustrated below, in a set of four threads, A, B, C, and D; a thread D may be considered "dependent" as referred to herein if D depends on the finish of another thread (e.g., A, B, C's finish) to start. In such an example, D is referred to herein as a "dependent thread", while A/B/C may be referred to herein as "associated threads". In such an example, associated threads A/B/C shall be dispatched earlier than dependent thread D based at least in part on the variant dependency pattern.

| A | B |
|---|---|
| C | D |

In such an example, associated threads (e.g., threads A/B/C) shall be dispatched earlier than the related dependent thread (e.g., thread D) based at least in part on the variant dependency pattern.

Processing may continue from operation 712 to operation 714, "EXECUTE THE DISPATCHED INDIVIDUAL COMPUTING UNIT THREADS WHEN THE ASSOCIATED THREADS ARE ALL FINISHED", where the dispatched individual computing unit threads may be sequentially executed. For example, individual computing unit threads may be sequentially executed when its associated threads are all finished, via the execution units.

In operation, process 700 may operate so that a spatial (e.g., and/or mode, etc.) variant thread dependency pattern may be used to split large size pixel block to multiple small size pixel blocks, (where each pixel block may be handled by one software thread) while maintaining the correct data dependency. This may significantly increase both total software thread number and the parallelism ramp-up time, which may result in an increase in EU parallelism. For example, on Intel's Gen graphics (or other similar device), this idea can be implemented through either media object or media walker commands.

For example, Intel Gen graphics media pipeline leverages an array of cores, or execution units (EUs), to execute a workload. This workload consists of kernels—a set of instructions compromising a program that is executed on the Gen hardware. Predominately, video decoder/encoder kernels contain thread dependency on the coding block level, where a thread must wait on dependency threads before starting its own execution. Under this situation, there is a small subset of the total number of threads that can actively run on the EUs at any given time. This often results in an under-utilization of the EUs. Additionally, the thread parallelism highly depends on the thread dependence pattern.

In some implementations of the proposed spatial variant dependency pattern, different thread dependency patterns are allowed on different spatial positions in the same thread space to more precisely match the real dependency scenario. This proposed spatial variant dependency pattern may reduce thread data granularity while keeping the correct dependency, may significantly increase the total software thread number, and may result in better GPU parallelism. (e.g., split one large 64×64 pixel covered by a thread to 4 small 32×32 pixel covered by a thread, allowing 4 times the number of threads).

In one complicated case, such as the HEVC hybrid decoder, a test of the proposed spatial variant dependency pattern was applied on Full HD HEVC main profile stream decoding. The results of this test showed a saving of about 20% to about 30% of total GPU decode kernel time on the tested GPU (here an Intel Haswell ULT GT3 was used).

Some additional and/or alternative details related to process 700 may be illustrated in one or more examples of implementations discussed in greater detail below with regard to FIG. 8.

Figure 8:
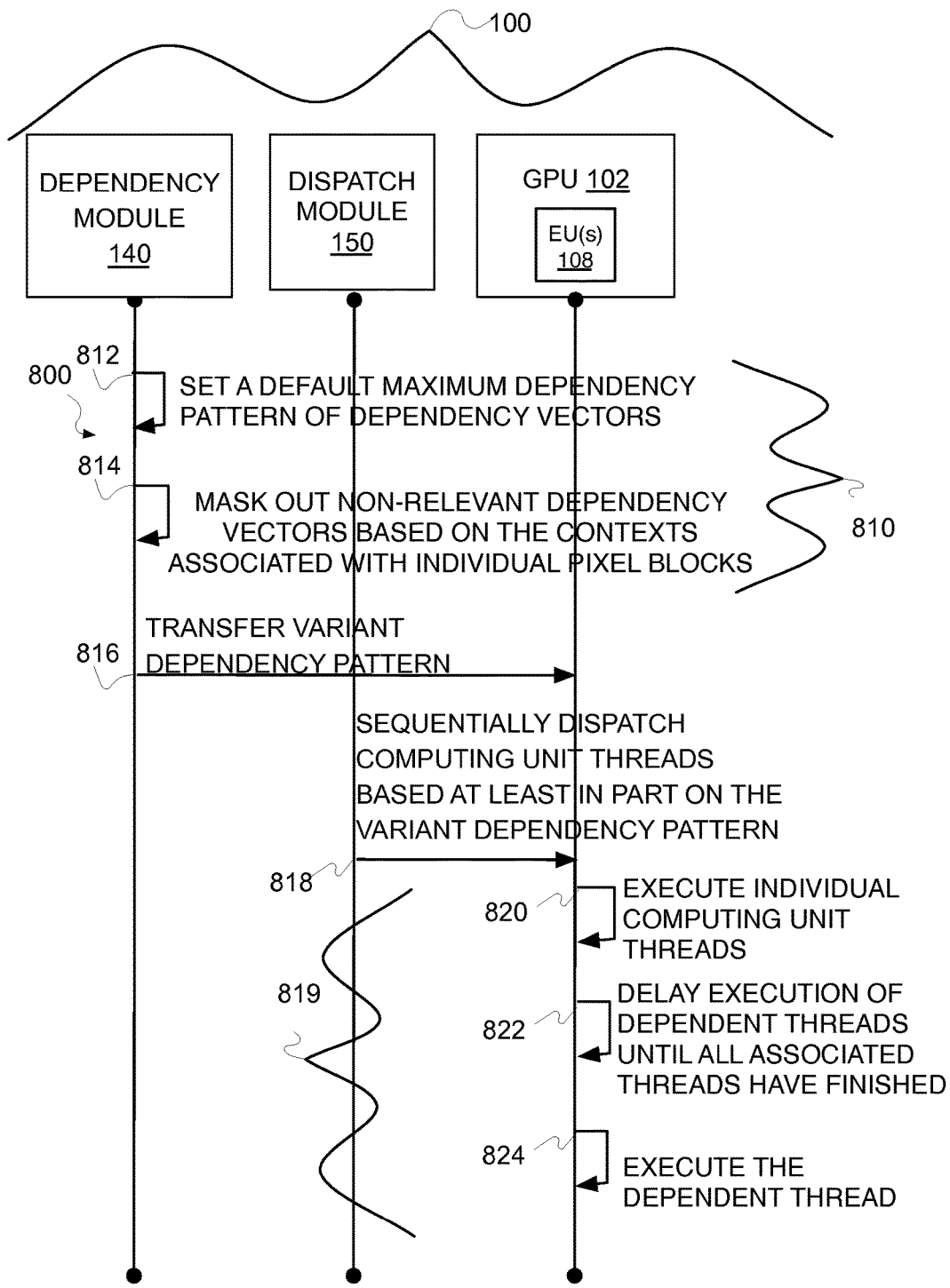
FIG. 8 is another illustrative diagram of an example graphics process for determining a variant parallel dependency pattern for the execution order of dependent threads during graphics processing.

FIG. 8 is an illustrative diagram of example graphics processing system 100 and video coding process 800 in operation, arranged in accordance with at least some implementations of the present disclosure. In the illustrated implementation, process 800 may include one or more operations, functions or actions as illustrated by one or more of actions 810, etc. By way of non-limiting example, process 800 will be described herein with reference to example graphics processing system 100 of FIGS. 1 and/or 9.

In the illustrated implementation, graphics processing system 100 may include one or more logic modules. For example, such logic modules may include scheduler logic module 130 (e.g., see FIG. 1), dependency logic module 140, dispatch logic module 150, the like, and/or combinations thereof. For example, such logic modules may be communicatively coupled with a plurality of execution units 108 of GPU 102. Although graphics processing system 100, as shown in FIG. 8, may include one particular set of blocks or actions associated with particular modules, these blocks or actions may be associated with different modules than the particular module illustrated here.

Process 800 may be utilized as a computer-implemented method for video coding. Process 800 may begin at operation 810, where a variant dependency pattern may be determined. For example, a variant dependency pattern associated with a plurality of pixel blocks of an active image may be determined based at least in part on one or more contexts associated with individual pixel blocks, via a dependency module. As illustrated, operations 812 and 814 may form part of operation 810.

In some implementations, the determined variant dependency pattern may be configured to establish an execution order of individual dependent threads associated with individual pixel blocks. The determined variant dependency pattern may include a variant set of dependency vectors configured to establish a relationship between a dependent thread and one or more associated threads.

Processing may continue at block 812, "SET A DEFAULT MAXIMUM DEPENDENCY PATTERN OF DEPENDENCY VECTORS", where a default maximum dependency pattern may be set. For example, a default maximum dependency pattern may be set to include a default set of dependency vectors, via dependency module 140.

Processing may continue from operation 812 to operation 814, "MASK OUT NON-RELEVANT DEPENDENCY VECTORS BASED ON THE CONTEXTS ASSOCIATED WITH INDIVIDUAL PIXEL BLOCKS", where non-relevant dependency vectors may be masked out from the default set of dependency vectors. For example, non-relevant dependency vectors may be masked out from the default set of dependency vectors to form the variant set of dependency vectors based at least in part on the one or more contexts associated with individual pixel blocks, via dependency module 140.

For example, Intel's Gen Graphics media pipeline has a basic media primitive command, media object. There may be one media object command for each thread. Within the media object command the hardware thread dependency mask may be set. The overall dependency vector may set in the Video Front End (VFE). In the above example, the default maximum dependency pattern, i.e. 5 dependencies (−1,1) (−1,1) (−1,0) (−1,−1) (0,−1) and (1,−1), may be set in the VFE. Each media object would mask out the non-relevant dependency vectors to reach this spatial variant dependency idea.

In some implementations, the variant dependency pattern may be set on a 32×32 pixel block granularity, although other granularities may be utilized.

In some examples, the one or more contexts may include a relative location of individual pixel blocks of the active image. In such an example, the dependency pattern may be spatially variant based at least in part on the relative location of individual pixel blocks of the active image. For example, a set of four adjacent pixel blocks of the active image may be made to have a maximum of five dependencies for an upper left pixel block, a maximum of four dependencies for an upper right pixel block, a maximum of four dependencies for a lower left pixel block, and a maximum of three dependencies for a lower right pixel block. Additionally or alternatively, the one or more contexts may include a coding mode data associated with individual pixel blocks of the active image; in such an example, the dependency pattern may be content variant based at least in part on the coding mode data of individual pixel blocks of the active image.

Processing may continue from operation 814 to operation 816, "TRANSFER VARIANT DEPENDENCY PATTERN", where the variant dependency pattern may be transferred. For example, the variant dependency pattern may be transferred execution units 110.

Processing may continue from operation 816 to operation 818, "SEQUENTIALLY DISPATCH COMPUTING UNIT THREADS BASED AT LEAST IN PART ON THE VARIANT DEPENDENCY PATTERN", where computing unit threads may be sequentially dispatched. For example, computing unit threads associated with individual pixel blocks may be sequentially dispatched to individual execution units of a graphics processor based at least in part on the variant dependency pattern, via dispatch module 150. For example, all associated threads may be dispatched earlier than a dependent thread based at least in part on the variant dependency pattern.

Process 800 may continue from operation 818 to one or more operations at 819, where the dispatched individual computing unit threads may be sequentially executed. For example, individual computing unit threads may be sequentially executed when its associated threads are all finished, via the execution units. As illustrated, operations 820, 822, and 824 may form part of operation 819.

For example, processing may continue from operation 818 to operation 820, "EXECUTE INDIVIDUAL COMPUTING UNIT THREADS", where individual computing unit threads may be executed. For example, individual computing unit threads may be executed based at least in part on the dispatch order, via execution units 108.

In some implementations, the sequentially execution, via execution units 110, of individual computing unit threads may result in parallel processing of 5 or more individual computing unit threads.

Processing may continue from operation 820 to operation 822, "DELAY EXECUTION OF DEPENDENT THREADS UNTIL ALL ASSOCIATED THREADS HAVE FINISHED", where a determination may be made during the execution whether all associated threads corresponding with the individual dependent threads have finished. For example, a determination may be made during the execution whether all associated threads corresponding with the individual dependent threads have finished based at least in part on the variant dependency pattern, via execution units 108. For example, execution of the individual dependent threads may be delayed to wait for the execution of the earlier dispatched associated threads.

Processing may continue from operation 822 to operation 824, "EXECUTE THE DEPENDENT THREAD", where the dependent threads may be executed. For example, the dependent threads may be executed, via execution units 108.

In operation, process 800 (and/or process 700) may be implemented so that a graphics media pipeline may utilize a media walker command that uses the hardware walker in the Video Front End (VFE) to generate threads associated with the rectangular object. There is a single media walker command for all threads. The specific dependency pattern related to the hardware dispatch order could be introduced to reach this spatial variant dependency idea, as the actual dependency is typically only enforced when the dependent thread has been dispatched earlier than the current thread. The dispatch order illustrated in FIG. 4 may be one option considered for such a media walker dispatch order.

While implementation of example processes 700 and 800, as illustrated in FIGS. 7 and 8, may include the undertaking of all blocks shown in the order illustrated, the present disclosure is not limited in this regard and, in various examples, implementation of processes 700 and 800 may include the undertaking only a subset of the blocks shown and/or in a different order than illustrated.

In addition, any one or more of the blocks of FIGS. 7 and 8 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 7 and 8 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
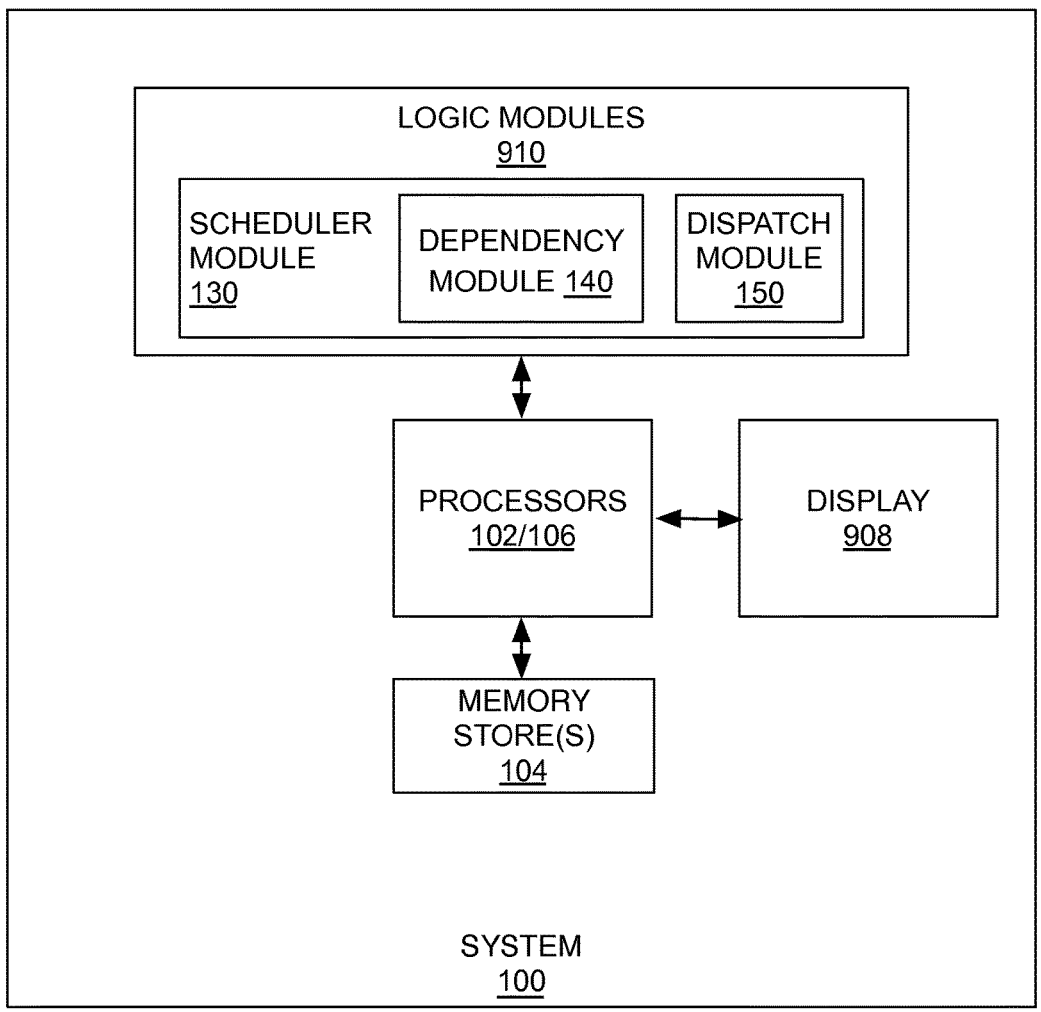
FIG. 9 is another illustrative diagram of an example graphics processing system for determining a variant parallel dependency pattern for the execution order of dependent threads during graphics processing.

FIG. 9 is an illustrative diagram of an example graphics processing system 100, arranged in accordance with at least some implementations of the present disclosure. In the illustrated implementation, graphics processing system 100 may include one or more processors 102/106, one or more memory stores 104, display 908, and/or logic modules 910. Logic modules 910 may include scheduler logic module 130, dependency logic module 140, dispatch logic module 150, the like, and/or combinations thereof.

As illustrated, processor 102/106, memory store 104, and/or display 908 may be capable of communication with one another and/or communication with portions of logic modules 910.

In various embodiments, scheduler logic module 130, dependency logic module 140, and/or dispatch logic module 150 may be implemented in hardware, while software may implement other logic modules. For example, in some embodiments, dependency logic module 140 may be implemented by application-specific integrated circuit (ASIC) logic while dependency logic module 140 may be provided by software instructions executed by logic such as processors 102/106. However, the present disclosure is not limited in this regard and scheduler logic module 130, dependency logic module 140, and/or dispatch logic module 150 may be implemented by any combination of hardware, firmware and/or software. In addition, memory stores 104 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 104 may be implemented by cache memory.

Figure 10:
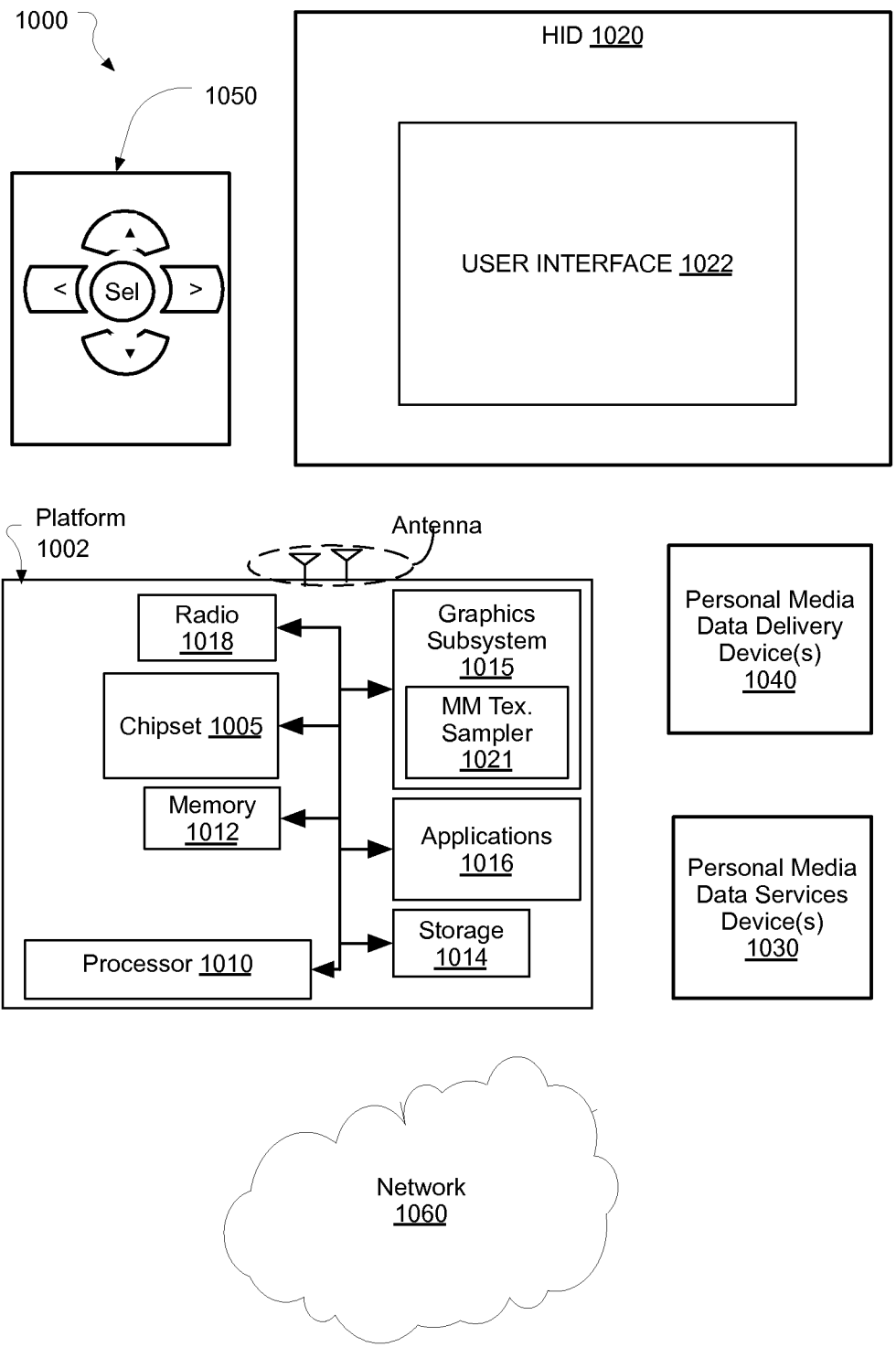
FIG. 10 is an illustrative diagram of an example system.

FIG. 10 illustrates an example system 1000 in accordance with the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for (8.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
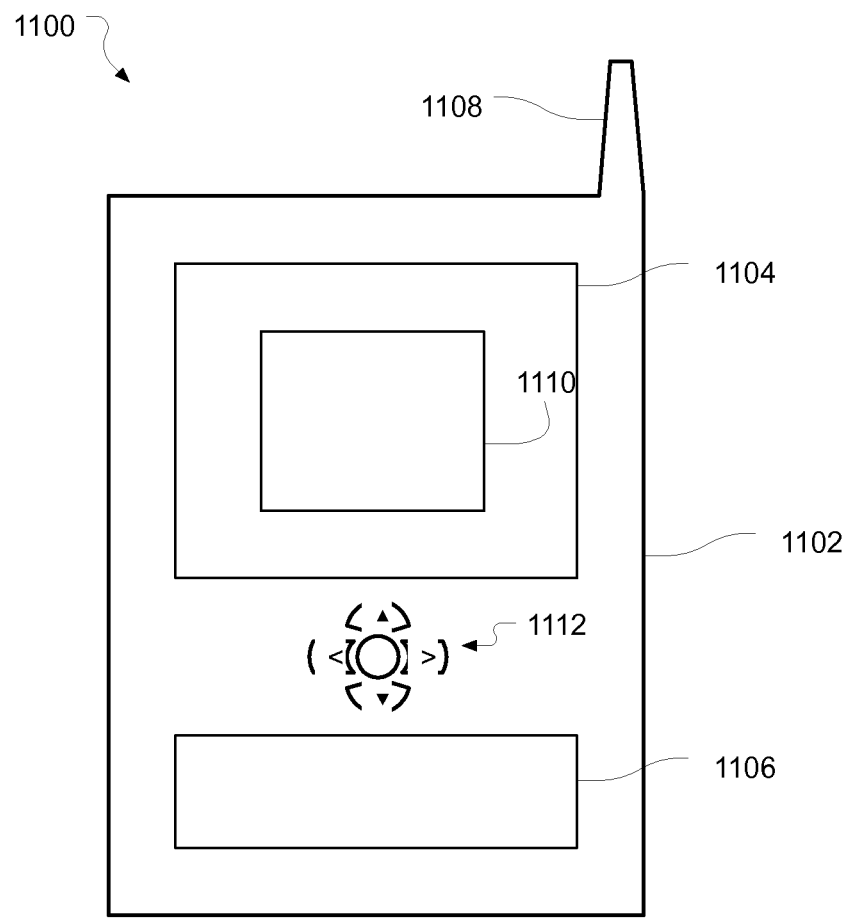
FIG. 11 is an illustrative diagram of an example system, all arranged in accordance with at least some implementations of the present disclosure.

As described above, system 1000 may be embodied in varying physical styles or form factors. FIG. 11 illustrates implementations of a small form factor device 1100 in which system 1000 may be embodied. In embodiments, for example, device 1100 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one implementation, a computer-implemented method for video coding may include determining, via a dependency module, a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks. A dispatch module may sequentially dispatch the computing unit threads to individual execution units of a graphics processor based at least in part on the variant dependency pattern. The execution units may execute the dependent thread when the all the associated threads are finished executing.

In a further example, the computer-implemented method for video coding may further include the variant dependency pattern being set on a 32×32 pixel block granularity. The one or more contexts may include a relative location of individual pixel blocks of the active image and/or include a coding mode data associated with individual pixel blocks of the active image. The dependency pattern may be spatially variant based at least in part on the relative location of individual pixel blocks of the active image where a set of four adjacent pixel blocks of the active image may has a maximum of five dependencies for an upper left pixel block, a maximum of four dependencies for an upper right pixel block, a maximum of four dependencies for a lower left pixel block, and a maximum of 3 dependencies for a lower right pixel block. The dependency pattern may be content variant based at least in part on the coding mode data of individual pixel blocks of the active image. The dependency module may set a default maximum dependency pattern including a default set of dependency vectors; and mask out non-relevant dependency vectors from the default set of dependency vectors to form the variant set of dependency vectors based at least in part on the one or more contexts associated with individual pixel blocks. The execution of the dependent thread when the all the associated threads are finished executing, may include: executing, via the execution units, individual computing unit threads based at least in part on a dispatch order of the sequential dispatch; delaying execution, via the execution units, of the dependent thread until all the associated threads are finished executing; and executing, via the execution units, the dependent thread. The execution, via the execution units, of individual computing unit threads comprises parallel processing of up to 5 individual computing unit threads.

In another implementation, a system for video coding may include a display device configured to present video data; one or more processors, including a plurality of execution units, communicatively coupled to the display device; one or more memory stores communicatively coupled to the one or more processors; a dependency module; and a dispatch module. The dependency module may be communicatively coupled to the one or more processors and configured to: determine a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks. The dispatch module may be communicatively coupled to the one or more processors and configured to: sequentially dispatch the computing unit threads to the individual execution units based at least in part on the variant dependency pattern. The execution units may be configured to: execute the dependent thread when the all the associated threads are finished executing.

In a further example, in the system for video coding the variant dependency pattern is set on a 32×32 pixel block granularity. The one or more contexts may include a relative location of individual pixel blocks of the active image and/or include a coding mode data associated with individual pixel blocks of the active image. The dependency pattern may be spatially variant based at least in part on the relative location of individual pixel blocks of the active image; wherein a set of four adjacent pixel blocks of the active image has a maximum of five dependencies for an upper left pixel block, a maximum of four dependencies for an upper right pixel block, a maximum of four dependencies for a lower left pixel block, and a maximum of 3 dependencies for a lower right pixel block. The dependency pattern further may be content variant based at least in part on the coding mode data of individual pixel blocks of the active image; The determination, via the dependency module, of the variant dependency pattern includes the dependency module may be configured to: set a default maximum dependency pattern including a default set of dependency vectors; and mask out non-relevant dependency vectors from the default set of dependency vectors to form the variant set of dependency vectors based at least in part on the one or more contexts associated with individual pixel blocks. The execution of the dependent thread when the all the associated threads are finished executing, may comprises the execution units being configured to: execute individual computing unit threads based at least in part on a dispatch order of the sequential dispatch; delay execution of the dependent thread until all the associated threads are finished executing; and execute the dependent thread. The execution, via the execution units, of individual computing unit threads may comprise parallel processing of up to 5 individual computing unit threads.

In another implementation, an apparatus for video coding may include a graphic processor including a plurality of execution units, a dependency module, and a dispatch module. The dependency module may be communicatively coupled to the one or more processors and configured to: determine a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks. The dispatch module may be communicatively coupled to the plurality of execution units and configured to: sequentially dispatch the computing unit threads to the individual execution units based at least in part on the variant dependency pattern. The execution units may be configured to: execute the dependent thread when the all the associated threads are finished executing.

In still another implementation, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
    determining, via a dependency module, a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks; wherein the one or more contexts include a relative location of individual pixel blocks of the active image; wherein the dependency pattern is spatially variant based at least in part on the relative location of individual pixel blocks of the active image; wherein a set of four adjacent pixel blocks of the active image has a maximum of five dependencies for an upper left pixel block, a maximum of four dependencies for an upper right pixel block, a maximum of four dependencies for a lower left pixel block, and a maximum of three dependencies for a lower right pixel block;
    sequentially dispatching, via a dispatch module, the computing unit threads to individual execution units of a graphics processor based at least in part on the variant dependency pattern; and
    executing, via the execution units, the dependent thread when the all the associated threads are finished executing.

2. The method of claim 1, wherein the variant dependency pattern is set on a 32×32 pixel block granularity.

3. The method of claim 1, wherein the one or more contexts include a coding mode data associated with individual pixel blocks of the active image.

4. The method of claim 1, wherein the one or more contexts include a coding mode data associated with individual pixel blocks of the active image; wherein the dependency pattern is content variant based at least in part on the coding mode data of individual pixel blocks of the active image.

5. The method of claim 1, wherein the one or more contexts include a relative location of individual pixel blocks of the active image and include a coding mode data associated with individual pixel blocks of the active image.

6. The method of claim 1, wherein the determining, via the dependency module, of the variant dependency pattern includes:
    setting a default maximum dependency pattern including a default set of dependency vectors; and
    masking out non-relevant dependency vectors from the default set of dependency vectors to form the variant set of dependency vectors based at least in part on the one or more contexts associated with individual pixel blocks.

7. The method of claim 1, wherein the execution, via the execution units, comprises parallel processing of up to 5 individual computing unit threads.

8. The method of claim 1, wherein the execution of the dependent thread when the all the associated threads are finished executing, comprises:
    executing, via the execution units, individual computing unit threads based at least in part on a dispatch order of the sequential dispatch;
    delaying execution, via the execution units, of the dependent thread until all the associated threads are finished executing; and
    executing, via the execution units, the dependent thread.

9. The method of claim 1, further comprising:
    wherein the variant dependency pattern is set on a 32×32 pixel block granularity;
    wherein the one or more contexts include a coding mode data associated with individual pixel blocks of the active image;
    wherein the dependency pattern is content variant based at least in part on the coding mode data of individual pixel blocks of the active image;
    wherein the determining, via the dependency module, of the variant dependency pattern includes:
        setting a default maximum dependency pattern including a default set of dependency vectors; and
        masking out non-relevant dependency vectors from the default set of dependency vectors to form the variant set of dependency vectors based at least in part on the one or more contexts associated with individual pixel blocks; and
    wherein the execution of the dependent thread when the all the associated threads are finished executing, comprises:
        executing, via the execution units, individual computing unit threads based at least in part on a dispatch order of the sequential dispatch;
        delaying execution, via the execution units, of the dependent thread until all the associated threads are finished executing; and
        executing, via the execution units, the dependent thread,
    wherein the execution, via the execution units, of individual computing unit threads comprises parallel processing of up to 5 individual computing unit threads.

10. A system for video coding on a computer, comprising:
a display device configured to present video data;
one or more processors, including a plurality of execution units, communicatively coupled to the display device;
one or more memory stores communicatively coupled to the one or more processors;
a dependency module communicatively coupled to the one or more processors and configured to: determine a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks; wherein the one or more contexts include a relative location of individual pixel blocks of the active image; wherein the dependency pattern is spatially variant based at least in part on the relative location of individual pixel blocks of the active image; wherein a set of four adjacent pixel blocks of the active image has a maximum of five dependencies for an upper left pixel block, a maximum of four dependencies for an upper right pixel block, a maximum of four dependencies for a lower left pixel block, and a maximum of three dependencies for a lower right pixel block;
a dispatch module communicatively coupled to the one or more processors and configured to: sequentially dispatch the computing unit threads to the individual execution units based at least in part on the variant dependency pattern; and
the execution units being configured to: execute the dependent thread when the all the associated threads are finished executing.

11. The system of claim 10, wherein the variant dependency pattern is set on a 32×32 pixel block granularity.

12. The system of claim 10, wherein the one or more contexts include a coding mode data associated with individual pixel blocks of the active image; wherein the dependency pattern is content variant based at least in part on the coding mode data of individual pixel blocks of the active image.

13. The system of claim 10, wherein the determination, via the dependency module, of the variant dependency pattern includes the dependency module being configured to:
set a default maximum dependency pattern including a default set of dependency vectors; and
mask out non-relevant dependency vectors from the default set of dependency vectors to form the variant set of dependency vectors based at least in part on the one or more contexts associated with individual pixel blocks.

14. The system of claim 10, wherein the execution, via the execution units, comprises parallel processing of up to 5 individual computing unit threads.

15. The system of claim 10, wherein the execution of the dependent thread when the all the associated threads are finished executing, comprises the execution units being configured to:
execute individual computing unit threads based at least in part on a dispatch order of the sequential dispatch;
delay execution of the dependent thread until all the associated threads are finished executing; and
execute the dependent thread.

16. The system of claim 10, further comprising:
wherein the variant dependency pattern is set on a 32×32 pixel block granularity;
wherein the one or more contexts include a coding mode data associated with individual pixel blocks of the active image;
wherein the dependency pattern further is content variant based at least in part on the coding mode data of individual pixel blocks of the active image;
wherein the determination, via the dependency module, of the variant dependency pattern includes the dependency module being configured to:
set a default maximum dependency pattern including a default set of dependency vectors; and
mask out non-relevant dependency vectors from the default set of dependency vectors to form the variant set of dependency vectors based at least in part on the one or more contexts associated with individual pixel blocks; and
wherein the execution of the dependent thread when the all the associated threads are finished executing, comprises the execution units being configured to:
execute individual computing unit threads based at least in part on a dispatch order of the sequential dispatch;
delay execution of the dependent thread until all the associated threads are finished executing; and
execute the dependent thread,
wherein the execution, via the execution units, of individual computing unit threads comprises parallel processing of up to 5 individual computing unit threads.

17. A graphics processing apparatus comprising:
a graphic processor including a plurality of execution units;
a dependency module communicatively coupled to the one or more processors and configured to: determine a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks; wherein the one or more contexts include a relative location of individual pixel blocks of the active image; wherein the dependency pattern is spatially variant based at least in part on the relative location of individual pixel blocks of the active image; wherein a set of four adjacent pixel blocks of the active image has a maximum of five dependencies for an upper left pixel block, a maximum of four dependencies for an upper right pixel block, a maximum of four dependencies for a lower left pixel block, and a maximum of three dependencies for a lower right pixel block;
a dispatch module communicatively coupled to the plurality of execution units and configured to: sequentially dispatch the computing unit threads to the individual execution units based at least in part on the variant dependency pattern; and
the execution units being configured to: execute the dependent thread when the all the associated threads are finished executing.

18. The graphics processing apparatus of claim 17, further comprising:
- wherein the variant dependency pattern is set on a 32×32 pixel block granularity;
- wherein the one or more contexts include a coding mode data associated with individual pixel blocks of the active image;
- wherein the dependency pattern further is content variant based at least in part on the coding mode data of individual pixel blocks of the active image;
- wherein the determination, via the dependency module, of the variant dependency pattern includes the dependency module being configured to:
  - set a default maximum dependency pattern including a default set of dependency vectors; and
  - mask out non-relevant dependency vectors from the default set of dependency vectors to form the variant set of dependency vectors based at least in part on the one or more contexts associated with individual pixel blocks; and
- wherein the execution of the dependent thread when the all the associated threads are finished executing, comprises the execution units being configured to:
  - execute individual computing unit threads based at least in part on a dispatch order of the sequential dispatch;
  - delay execution of the dependent thread until all the associated threads are finished executing; and
  - execute the dependent thread,
- wherein the execution, via the execution units, of individual computing unit threads comprises parallel processing of up to 5 individual computing unit threads.

19. At least one non-transitory machine readable medium comprising: a plurality of instructions that in response to being executed on a computing device, causes the computing device to perform operations, comprising:
- determining, via a dependency module, a variant dependency pattern associated with a plurality of pixel blocks of an active image based at least in part on one or more contexts associated with individual pixel blocks, wherein the determined variant dependency pattern includes a variant set of dependency vectors configured to establish a relationship between a dependent thread and one or more associated threads among a group of computing unit threads associated with the individual pixel blocks; wherein the one or more contexts include a relative location of individual pixel blocks of the active image; wherein the dependency pattern is spatially variant based at least in part on the relative location of individual pixel blocks of the active image; wherein a set of four adjacent pixel blocks of the active image has a maximum of five dependencies for an upper left pixel block, a maximum of four dependencies for an upper right pixel block, a maximum of four dependencies for a lower left pixel block, and a maximum of three dependencies for a lower right pixel block;
- sequentially dispatching, via a dispatch module, the computing unit threads to individual execution units of a graphics processor based at least in part on the variant dependency pattern; and
- executing, via the execution units, the dependent thread when the all the associated threads are finished executing.

20. The at least one non-transitory machine readable medium method of claim 19, further comprising:
- wherein the variant dependency pattern is set on a 32×32 pixel block granularity;
- wherein the one or more contexts include a coding mode data associated with individual pixel blocks of the active image;
- wherein the dependency pattern is content variant based at least in part on the coding mode data of individual pixel blocks of the active image;
- wherein the determining, via the dependency module, of the variant dependency pattern includes:
  - setting a default maximum dependency pattern including a default set of dependency vectors; and
  - masking out non-relevant dependency vectors from the default set of dependency vectors to form the variant set of dependency vectors based at least in part on the one or more contexts associated with individual pixel blocks; and
- wherein the execution of the dependent thread when the all the associated threads are finished executing, comprises:
  - executing, via the execution units, individual computing unit threads based at least in part on a dispatch order of the sequential dispatch;
  - delaying execution, via the execution units, of the dependent thread until all the associated threads are finished executing; and
  - executing, via the execution units, the dependent thread,
- wherein the execution, via the execution units, of individual computing unit threads comprises parallel processing of up to 5 individual computing unit threads.

* * * * *